United States Patent [19]

Schoenberger

[11] Patent Number: 4,520,259
[45] Date of Patent: May 28, 1985

[54] ELECTRICAL ENERGY SAVER

[76] Inventor: Frederick Schoenberger, 175 Antioch Dr., Elyria, Ohio 44035

[21] Appl. No.: 454,275

[22] Filed: Feb. 14, 1983

[51] Int. Cl.³ .............................................. H05B 1/02
[52] U.S. Cl. ................................. 219/501; 219/492; 219/493; 219/508; 219/334; 34/48; 34/53
[58] Field of Search ............... 219/494, 493, 492, 501, 219/508, 507, 509, 328, 330, 334; 34/48, 53; 236/46 F, 46 R

[56] References Cited

U.S. PATENT DOCUMENTS

| | | | |
|---|---|---|---|
| 2,743,530 | 5/1956 | Smith et al. | 34/45 |
| 3,864,844 | 2/1975 | Heidtmann | 34/48 |
| 4,019,259 | 4/1977 | Veraart | 34/48 |
| 4,083,118 | 4/1978 | Cotton | 34/44 |
| 4,112,588 | 9/1978 | Marcade | 34/45 |
| 4,195,415 | 4/1980 | Livings et al. | 34/48 |
| 4,418,271 | 11/1983 | Smock | 219/493 |

Primary Examiner—M. H. Paschall
Attorney, Agent, or Firm—Gustalo Nunez

[57] ABSTRACT

An electrical system for providing an energy load regulator for use with electric clothes dryers and electric hot water tanks. The load regulator cycles the heating element within the dryer or hot water tank for predetermined periods while the appliance remains in an operative stage throughout the on and off cycles of the heating element.

3 Claims, 2 Drawing Figures

4,520,259

ELECTRICAL ENERGY SAVER

BACKGROUND OF THE INVENTION

1. Field of the Invention

This invention relates to drier appliances and in particular to control means designed to conserve electrical energy.

2. Description of the Prior Art

Thomas R. Smith, U.S. Pat. No. 2,743,530 discloses control means which are used to prevent overheating and damage to the clothes. In this particular invention, a tumbler type clothes drier is provided with means for heating the clothes to evaporate the moisture therein, the drier is further provided with a temperature responsive thermostat within the drying chamber holding relay connected in series with the heating means circuit for delaying operation of a timer motor until after the thermostat is operated to deenergize the heating means. Upon deenergization of the heating means, the relay acts to prevent reenergization of the heating means even though the thermostat moves back to its closed position.

Roque Denis Marcade, U.S. Pat. No. 4,112,588 is directed to a control for use in a dryer appliance having a heating means including an electrical component, thermostatic switch means connected in series with the component for operating the heating means as an incident of the temperature sensed by the thermostat means being below a preselected temperature, a timer including a timer motor, and a control switch connected in series with the motor for causing operation of the timer. A capacitor is connected from between the timer motor and the control switch to between the thermostat means and the electrical component for connecting the timer switch in series with the electrical component when the control switch is open. The capacitor further effectively connects the timer motor with the thermostat switch means so that the series connection of the timer motor and the capacitor is effectively shorted out by the thermostat switch means when the thermostat switch means is closed to energize the electrical component.

The capacitance of the capacitor is preselected to form, with the inductance of the timer motor, a series resonant circuit condition when the thermostat switch means and the control switch are open wherein the voltage across the timer motor is at least a minimum operating voltage of the timer motor and the voltage across the electrical component is less than minimum operating voltage to cause effective heating operation thereof.

Curran D. Cotton, U.S. Pat. No. 4,083,118 is directed to a time and temperature control circuit for fabric dryers in which the heating element is center tapped to control the heater wattage. The control includes a resistive heating element in series with high limit and cycling thermostats and connected across the two power lines of a three wire alternating current power supply. The drive motor of the timer is electrically connected between the junction of the two legs of the heating circuit and the neutral wire of the power supply. The impedance of the timer drive motor is high compared to the resistance of the heating element; therefore, when the heating element is energized for drying fabrics, the current flow to the timer drive motor is negligible and the timer will not advance. When the cycling thermostat in one of the legs opens at a predetermined temperature, the heating element will be deenergized and current will flow in the other leg and neutral lines and the timer will advance until the thermostat closes to reenergize the heating element.

SUMMARY OF THE INVENTION

It is an object of the instant invention to provide a load regulator for use with electric clothes dryers and electric hot water tanks. It is also intended to provide a load regulator portable in nature and one which increases the conservation of electrical energy while simultaneously not decreasing the efficiency of the electrical appliance.

All of these objects are achieved in a portable load regulator which in use is plugged into a conventional wall power source and the appliance is plugged into the load regulator. The load regulator contemplated herein cycles the heating element within the dryer or hot water tank on and off for predetermined periods of time while the appliance remains operative. Not only is energy conserved by switching the heating element off, but the utility meter is not energized for a sufficient length of time to reach its maximum reading. This results also in a smaller billing by the utility company since billing is determined by the greatest amount of use within a predetermined period of time. In operation, as indicated above, the heating element in the dryer is switched off, however, the dryer is still kept on, i.e., the tumbler drum containing the clothes is still rotating. The heat retained within the tumbler is used, in the absence of new generated heat, to further continue drying the clothes. After a predetermined shut off period, the heating element is again energized and therefore, a new heat is directed into the clothes tumbler.

The control circuitry in the dryer utilizes a conventional cam timer motor to gate a bidirectional rectifier, essentially two SCR's in parallel, to function as an electrically controlled switch for AC loads and an npnpn structure that can be triggered into either forward or reverse conduction by a pulse applied to its gate electrode. A bidirectional rectifier as described here is known as a thyristor and more commonly as a triac. The heating element in the dryer or hot water tank will be energized whenever the triac is conducting.

In the disclosed embodiment of the invention, the heating element will be energized during the intervals that the triac is conducting as is determined by a preprogrammed timer control. The load regulator control contemplated herein is extremely simple and economical to construct and yet provides a savings in energy and money.

DESCRIPTION OF THE FIRST PREFERRED EMBODIMENT

Figure 1:
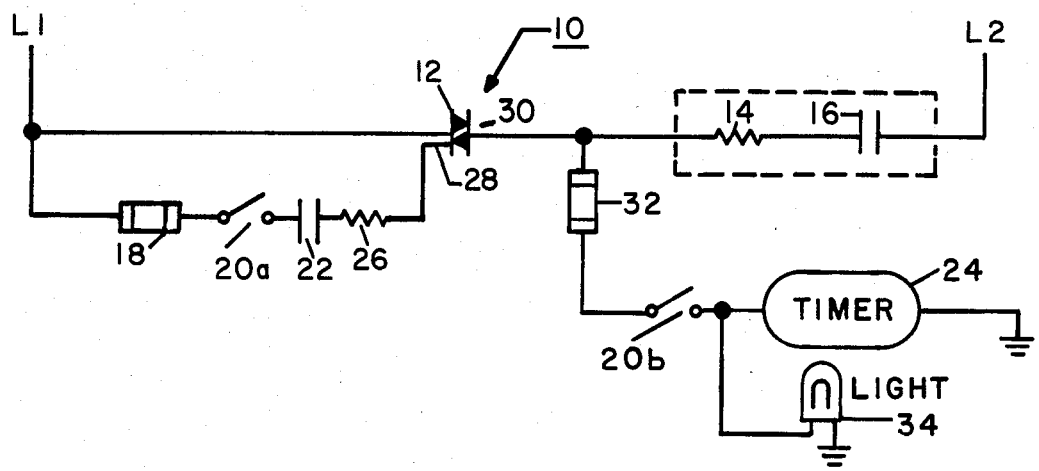
FIG. 1 is an electrical schematic diagram of the control circuit of the instant invention.

Referring to FIG. 1, there is shown a first embodiment of the invention for an improved control circuit for use as a load regulator electric clothes dryers generally designated as 10. The control circuit is supplied with AC electrical power of usually 240 volts through a pair of load lines L1 and L2. The electrical power circuit for the heating element 14 located within the dryer extends from L1 through a triac 12, heating element 14, control contact 16 and on to L2. L1 is also connected and extends on through a fuse 18. From fuse 18, the circuit extends on through switch 20a which is a double pole double throw switch. From switch 20a, the circuit extends on through the normally open contacts 22, which are associated with a timer motor 24, and on through a resistor 26 and on to the gate 28 on the triac 12.

Referring further to FIG. 1, connected to main terminal 30 of the triac 12 is a fuse 32 which extends on to switch 20b, which is a part of switch 20, and which then extends on to a timer 24 and on to ground.

It is noted that the heating element 14 and the control contact 16 are part of the dryer and thus internal to the dryer. This is emphasized by having the heating element 14 and control contact 16 enclosed in the dotted rectangle.

OPERATION OF THE DRYER CONTROL

In order to initiate the start of the control circuit 10, it is necessary to first close the double pole double throw switch 20 which closes contacts 20a and 20b. This causes a voltage to be impressed across power lines L1 and L2. However nothing will happen until the dryer is turned on and further, not until the triac is conducting. When the dryer is turned on, the control contact 16 will close. It is noted here that the control contact 16 is placed in the heater circuit to perform several functions, one of which is to open when the temperature exceeds a certain preset limit designated by the manufacturer. With control contact 16 closed, the triac 12 will still not be rendered into a conducting state because of the normally open contacts 22 will prevent the triac from being gated.

Now with switch 20 closed and control contact 16 closed, voltage will be impressed across the timer 24 through switch 20b and fuse 32 down to ground. This results in the timer motor being activated. The timer used here is a conventional cam timer and the one used here is a 120 VAC cam timer having both normally open and normally closed contacts and having a total time cycle of 10 minutes. The cam associated with the timer motor controls the duration or the periods when the normally open contacts will be closed or open and the periods when the normally closed contacts will be open or closed. These periods can be and are preprogrammed. The particular periods found to best suited for drying clothes is for the normally open contact 22 to be closed for 5.5 to 6 minutes and to be open for 4 to 4.5 minutes.

As described above, the normally open contact 22 will close, thus resulting in a gating voltage to be impressed on the gate 28 through L1, fuse 18, switch 20a, now closed contact 22 and the resistor 26. The triac will now be rendered into a conducting state for 5.5 minutes. There is now full L1-L2 voltage impressed across the dryer heating element 14 for a period of 5.5 minutes.

Simultaneously, the timer 24 will now be energized via L1 through the triac 12. After a period of 5.5 minutes, the normally open contact 22 will now be opened by the action of the cam associated with the timer 24. At this point in time, the triac 12 will be rendered non-conducting and the L1-L2 voltage across the dryer heating element 14 will be disrupted and hence, the dryer heating element 14 will begin to cool.

It is noted here that only the dryer heating element voltage is being disrupted. The timer 24 will still be kept energized through L2 and after a preset period, 4.5 minutes in this instance, will cause the normally open contact 22 to close again, thus commencing the entire heating cycle again. None of the functions of the dryer, such as the tumbler drum motor operation will be disrupted. Everything will continue in a normal fashion with the exception that heat will be applied to the clothes for set periods of time.

An indicating lamp 34 has been placed in parallel with the timer 24 for purposes of information, i.e., whenever lamp 34 is on, the user of the dryer knows that the timer is being energized and therefore, the dryer operation is still proceeding. When the dryer is turned off, control contact 16 is opened which then stops everything.

It has been empirically found that by alternately energizing and de-energizing the dryer heating element in the manner described herein, that the clothes dry within the same amount of time as it would take an identical dryer to dry an identical load, with the exception, that with the control regulator 10, there is an electrical energy savings of up to 30%.

In the actual use of the control regulator 10, it houses in a U.L. approved box. It was found necessary to utilize an aluminum heat sink with the triac 12 because of heat considerations.

DESCRIPTION OF THE SECOND PREFERRED EMBODIMENT

Figure 2:
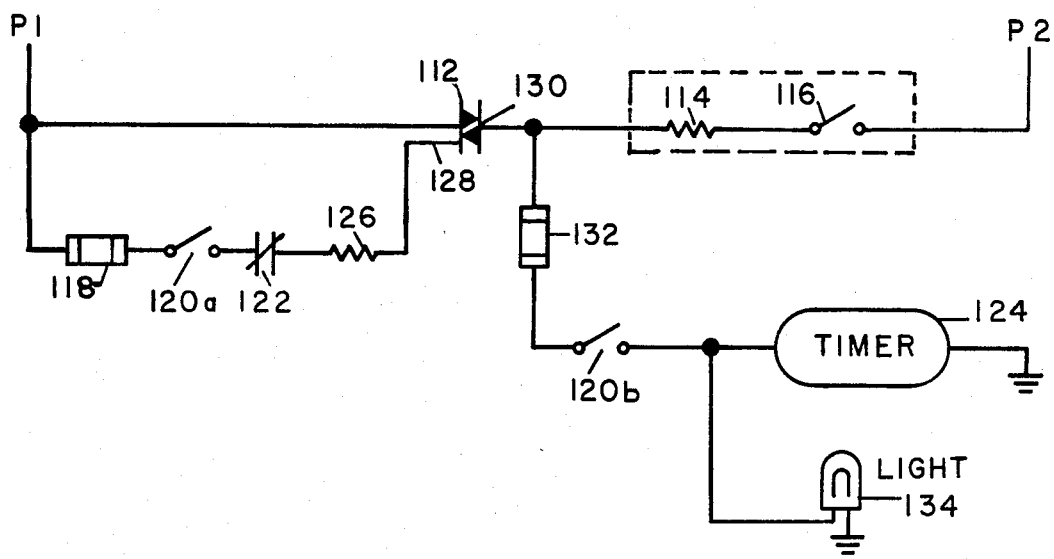
FIG. 2 is an electrical schematic diagram of a second embodiment of the control circuit of the instant invention.

Referring to FIG. 2, there is shown a second embodiment of the invention for an improved control circuit for the use as a load regulator for electric hot water tanks generally designated as 110. The control circuit is supplied with AC electrical power through load lines P1 and P2. The electrical power circuit for a heating element 114 located within the hot water tank extends from P1 through a triac 112, heating element 114, a thermostat 116 and on to P2. P1 is also connected and extends on through fuse 118. From fuse 118, the circuit extends on through switch 120a which is a double pole double throw switch. From switch 120a, the circuit extends on through the normally closed contacts 122, which are associated with a timer motor 124, and on through a resistor 126 and on to the gate 128 of the triac 112.

Referring further to FIG. 2, connected to main terminal 130 of the triac 112 is a fuse 132 which extends on to switch 120b, which is a part of switch 120, and which then extends on to timer 124 and on to ground.

It is noted that the heating element 114 and the thermostat 116 are internal to the hot water tank. This is emphasized by having the heating element 14 and thermostat 16 enclosed in the dotted rectangle.

OPERATION OF THE HOT WATER TANK

In order to initiate the start of the control circuit 110, it is necessary to first close the double pole double throw switch 120 which closes contacts 120a and 120b. This causes a voltage to be impressed across power lines P1 and P2. However, nothing will happen until the hot water tank is turned on and further, not until the triac 112 is in a conducting state. The thermostat 116 will close when the water temperature in the tank is at a predetermined temperature. It is noted here that the thermostat 116 is placed in the hot water tank to perform several functions, one of which is to open when the water temperature exceeds a certain preset limit and to close when the water temperature is below a certain preset limit.

Now with switch 120 closed and thermostat 116 closed, voltage will be impressed across the timer 124 through switch 120b and fuse 132 down to ground. This results in the timer motor being activated. The timer 134 used here is a conventional cam timer and the one used herein is a 120 VAC cam timer having both normally open and normally closed contacts and having a total time cycle of 10 minutes. The cam associated with the timer controls the duration or the periods when the normally closed contacts will be open or closed and the periods when the normally open contacts will be closed or open. These periods can be and are preprogrammed. The particular periods found to be best suited for use in a hot water tank are for the normally closed contact 122 to be closed for 3.5 minutes and to be open for 6.5 minutes.

As described above, the normally closed contact 122 results in a gating voltage to be impressed on the gate 128 through P1, fuse 118, switch 120a, closed contact 122 and the resistor 126. The triac will now be rendered into a conducting state for 3.5 minutes. There is now full P1-P2 voltage impressed across the hot water tank heating element 114 for a period of 3.5 minutes.

Simultaneously, the timer 124 will now be energized via P1 through the triac 112. After a period of 3.5 minutes, the normally closed contact 122 will be opened by the action of the cam associated with the timer 124. At this point in time, the triac 112 will be rendered non-conducting and the P1-P2 voltage across the hot water tank heating element 114 will be disrupted and hence, the hot water heating element 114 will be disrupted and hence, the hot water heating element 114 will begin to cool.

It is noted here that only the hot water tank heating element voltage is being disrupted. The timer 134 will still be kept energized through P2 and after a preset period, 6.5 minutes in this instance, will cause the normally closed contact 122 to close again, thus commencing the entire heating cycle again. Everything will continue in a normal fashion with the exception that heat will be applied to the water for set periods of time. The thermostat 116 will open when the water temperature reaches a predetermined heat.

An indicating lamp 134 has been placed in parallel with the timer 124 for purposes of information, i.e., whenever lamp 134 is on, the user of the dryer knows that the timer is being energized and therefore, the hot water cycle operation is proceeding.

In the actual use of the control regulator 10, it houses in a U.L. approved box. It was found necessary to utilize an aluminum heat sink with the triac 12 because of heat consideration.

In the drawings and specification there has been set forth two preferred embodiments of the invention and although specific terms are employed these are used in a generic and descriptive sense only and not for purposes of limitation. Changes in form and the proportion of parts as well as the substitution of equivalents are contemplated as circumstances may suggest or render expedient without departing from the spirit or scope of the invention as further defined in the following claims.

What is claimed:

1. An energy saving control circuit in an electrical clothes dryer having a rotating clothes tumbler and comprising:
   first and second power supply lines;
   a bidirectional electronic switch including gate means being connected to said first power supply line;
   said bidirectional electronic switch connected in series to an electrical heating element, said electrical heating element terminating in said second power supply line;
   said gate means connected to said first power supply line by a first electric switch and a normally open contact in a series connection, said first electric switch closed when a dryer on-off control button is on; and
   a timer and electrical timer motor connected intermediate to said bidirectional electronic switch and said electrical heating element by a second electric switch and ground, said second electric switch closed when said dryer on-off control button is on, said timer motor being energized by said second power supply line whereby after a predetermined time, said normally open contact responsive to said timer motor closes resulting in a gating pulse applied to said bidirectional electronic switch rendering said bidirectional electronic switch into conduction, and said heating element being energized by said first and second power supply lines, for a predetermined period of time, thereafter, said timer motor causes said normally open contact to open thereby deenergizing said heating element.

2. An energy saving control circuit of the portable type which may be plugged into an energy source and which has an outlet adopted to receive an electrical plug from an electrical dryer appliance, comprising:
   first and second power supply lines;
   a bidirectional electronic switch having a first base, a second base and one gate means, said first base means connected directly to said first supply line, said gate means connected to said first supply line through a first electric switch and a normally open contact responsive to the operation of a timer motor, wherein said first electric switch is part of a double pole double throw switch;
   said second base in series connection with said second power supply line through an electric heating element and an on-off control switch; and
   an electric timer motor connected by a second electric switch intermediate said second base and said heating element and ground, wherein said second electric switch is part of a double pole double throw switch, said timer motor energized by said second power supply line when said double pole double throw switch is in an on position, and said second electric switch is closed, said timer motor, after a first predetermined period of time closing said normally open contacts causing the imposition of a gating signal on said gate means, thereby rendering said bidirectional electronic switch conductive, causing said heating element to be energized and said timer motor to be energized by said first supply lines for a second predetermined period of time, such that after said second predetermined period of time, said timer motor opening said normally opening contact thereby deenergizing said gating signal and thereby rendering said bidirectional switch non-conductive and causing said timer motor to be energized by said second supply line for another first predetermined period of time, said alternate means for energizing said timer motor continuing until said on-off control switch is in an off position.

3. An energy saving electrical control circuit of the portable type and housed in a portable box which may be plugged into an energy source and which is adapted to receive an electrical plug from an electrical appliances, comprising:

first and second power supply lines;

a bidirectional electronic switch having a first base, a second base and one gate means, said first base means connected directly to said first supply line, said gate means connected to said first supply line through a normally closed first electric switch and by a normally closed contact responsive to the operation of a timer motor;

said second base in series connection with said second power supply line through an electric heating element and thermostatically controlled switch;

an electric timer motor connected by normally closed second electric switch intermediate said second base and said heating element and ground, said timer motor energized by said first power supply line when said thermostatically controlled switch is in an on position, said normally closed contact causing the imposition of a gating signal on said gate means, rendering said bidirectional electronic switch conductive, causing said heating element to be energized for a first predetermined period of time, such that after said first predetermined period of time, said timer motor opens said normally closed contact deenergizing said gating signal and thereby rendering said bidirectional switch nonconductive and causing said timer motor to be energized by said second supply line for a second predetermined period of time, wherein said alternate means for energizing said timer motor continuing until said first and second normally closed switches are in an off position.

* * * * *